United States Patent
Hanson et al.

(10) Patent No.: US 8,049,727 B2
(45) Date of Patent: Nov. 1, 2011

(54) ACCESSORY MODULE FOR HANDHELD DEVICES

(75) Inventors: William Robert Hanson, Mountain View, CA (US); Yoon Kean Wong, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 11/582,522

(22) Filed: Oct. 17, 2006

(65) Prior Publication Data

US 2007/0080935 A1    Apr. 12, 2007

Related U.S. Application Data

(63) Continuation of application No. 09/975,544, filed on Oct. 11, 2001, now Pat. No. 7,280,100.

(51) Int. Cl.
*G09G 5/00* (2006.01)

(52) U.S. Cl. ......................................... 345/169; 345/156

(58) Field of Classification Search .................... 345/1.1, 345/1.2, 1.3, 2.1, 2.2, 2.3, 156–184, 901, 345/903, 905; 361/679.01–679.61
See application file for complete search history.

(56) References Cited

U.S. PATENT DOCUMENTS

| | | | |
|---|---|---|---|
| 5,010,547 A | 4/1991 | Johnson et al. | |
| 5,012,219 A | 4/1991 | Henry | |
| 5,075,684 A | 12/1991 | DeLuca | |
| 5,359,317 A | 10/1994 | Gomez et al. | |
| 5,394,140 A | 2/1995 | Wong et al. | |
| 5,430,436 A | 7/1995 | Fennell | |
| 5,606,594 A | 2/1997 | Register et al. | |
| 5,612,682 A | 3/1997 | DeLuca et al. | |
| 5,650,776 A | 7/1997 | Mitchell et al. | |
| 5,699,244 A | 12/1997 | Clark, Jr. et al. | |
| 5,705,995 A | 1/1998 | Laflin et al. | |
| 5,790,371 A | 8/1998 | Latocha et al. | |
| 5,848,298 A * | 12/1998 | Steere et al. | 710/62 |
| 5,859,628 A | 1/1999 | Ross et al. | |
| 5,903,852 A | 5/1999 | Schaupp, Jr. et al. | |
| 5,958,006 A | 9/1999 | Eggleston et al. | |
| 6,027,828 A | 2/2000 | Hahn | |
| 6,036,093 A | 3/2000 | Schultz | |
| 6,115,248 A | 9/2000 | Canova et al. | |
| 6,157,630 A | 12/2000 | Adler et al. | |
| 6,189,056 B1 | 2/2001 | Ogura et al. | |
| 6,231,371 B1 * | 5/2001 | Helot | 439/374 |
| 6,234,389 B1 * | 5/2001 | Valliani et al. | 235/380 |
| 6,282,088 B1 | 8/2001 | Canova et al. | |
| 6,283,777 B1 | 9/2001 | Canova et al. | |
| 6,327,482 B1 * | 12/2001 | Miyashita | 345/903 |
| 6,445,385 B1 | 9/2002 | Shin et al. | |
| 6,489,932 B1 * | 12/2002 | Chitturi et al. | 345/30 |
| 6,641,533 B2 * | 11/2003 | Causey et al. | 600/300 |

(Continued)

OTHER PUBLICATIONS

Definition of Handheld Computer, printed from the website: http//dictionary.reference.com, dated Feb. 11, 2004.

(Continued)

*Primary Examiner* — Nitin Patel

(57) ABSTRACT

An accessory module or accessory display device for a handheld computer is disclosed. The device includes an interface configured to be coupled to a handheld computer through an interface slot. The module may be flexibly hinged to the interconnect interface, permitting the coupling of the module to a variety of host devices. The module includes memory configured to store information customized to the user.

19 Claims, 3 Drawing Sheets

U.S. PATENT DOCUMENTS

| | | | |
|---|---|---|---|
| 6,655,863 B2 | 12/2003 | Lin | |
| 6,731,951 B1 * | 5/2004 | Takebe et al. | 455/557 |
| 6,731,952 B2 * | 5/2004 | Schaeffer et al. | 455/557 |
| 6,813,619 B2 * | 11/2004 | Devara | 1/1 |
| 6,912,283 B2 * | 6/2005 | Meyerson et al. | 379/428.04 |
| 6,976,111 B1 | 12/2005 | Mills et al. | |
| 7,093,198 B1 * | 8/2006 | Paatero et al. | 715/746 |
| 7,187,947 B1 * | 3/2007 | White et al. | 455/556.1 |
| 7,197,584 B2 * | 3/2007 | Huber et al. | 710/72 |
| 7,280,100 B2 * | 10/2007 | Hanson et al. | 345/169 |
| 2002/0013161 A1 * | 1/2002 | Schaeffer et al. | 455/557 |
| 2002/0024506 A1 | 2/2002 | Flack et al. | |
| 2002/0046185 A1 * | 4/2002 | Villart et al. | 705/64 |
| 2002/0122410 A1 * | 9/2002 | Kulikov et al. | 370/349 |
| 2003/0016327 A1 | 1/2003 | Kotchick et al. | |
| 2003/0017746 A1 | 1/2003 | Lee | |

OTHER PUBLICATIONS

Definition of Handheld, printed from the website: http//searchmobilecomputing.techtarget.com, dated Feb. 11, 2004.

REX 5000, printed from the website: http://en.wikipedia.org/wiki/REX_5000, dated Jan. 17, 2007.

REX 6000, printed from the website: http://en.wikipedia.org/wiki/REX_6000, dated Jan. 17, 2007.

Rex Handheld Poised for Resurrection, printed from the website: http://news.com.com/2100-1040-248127.html, dated Jan. 17, 2007.

Franklin Revs Rex Handheld, printed from the website: http://news.com.com/2100-1001-215272.html, dated Jan. 17, 2007.

Computers: Systems: Handhelds: Rex 6000, printed from the website: http://dmoz.org/Computers/Systems/Handhelds/Rex_6000/, dated Jan. 17, 2007.

* cited by examiner

ACCESSORY MODULE FOR HANDHELD DEVICES

CROSS-REFERENCE TO RELATED PATENT APPLICATIONS

This application is a Continuation of U.S. application Ser. No. 09/975,544, filed Oct. 11, 2001, incorporated herein by reference in its entirety.

BACKGROUND

The present specification relates to accessory devices and modules for portable electronic devices such as, but not limited to, handheld computers. In particular, the present specification relates to a display module or other accessory that removably interfaces with a variety of host devices, especially a handheld computer.

Handheld computing devices, palmtops, personal digital assistants (PDAs) or handheld computers typically weigh less than a pound and fit in a pocket. These handheld computers generally provide some combination of personal information management, database functions, word processing, and spreadsheets. Because of the small size and portability of handheld computers, strict adherence to hardware constraints, such as input device hardware constraints and accessory device hardware constraints, must be maintained.

Further, it is desirable to include accessories for the handheld computer to further its functionality. Such accessory devices include memory devices, positioning devices, audio players, voice recorders, Bluetooth transceivers, digital cameras, tuners, network cards, pedometers, mobile telephone transceivers, and the like.

It is conventional to provide accessory devices that are connectable to an interface on the handheld computer. Because of the small size of handheld computers, the design of accessories connectable to the handheld computer are often a size and ergonomic issue.

To provide the user the benefits of interoperability, it is often necessary to provide mechanisms for sharing information and sharing hardware between devices. Accordingly, it is conventional to provide hardwired, infrared, or radio frequency communications for transferring data between devices. It is also known to transfer data between devices on a recordable accessory by recording information when the accessory is inserted in one host device and reading the information when the accessory is inserted in a second host device. It is further known to have such a recording accessory that seamlessly interfaces with a variety of host devices.

It may be desirable that such a seamless recording accessory also display data to the user. Furthermore, it may be desirable for the user to have the ability to input commands to control the information displayed, as well as to enter or change stored data. Further still, it may be desirable to provide an audible output for the user. An accessory device capable of information storage, display, input, and output may be needed that further mechanically couples to and transfers data with a variety of host devices, especially a handheld computer.

There is also a need to display information on a recordable accessory when the accessory is not inserted into an intelligent host device. This would permit the stand-alone operation. When operated in stand-alone mode, there is a need to retain certain key data customized by the user, and display, record, and/or manipulate the data.

In addition, there is a need for an accessory device capable of transferring data to and from a handheld computer and displaying data when coupled to a non-intelligent host device, such as a wearable watch wristband.

There is also a need to provide a recordable accessory with a display for sharing user-customized information among a variety of intelligent host devices. In addition to mechanical coupling, the interface between the recordable display accessory must provide for exchanging data with the coupled host device. Furthermore, handheld computer users need such a device that is of appropriate size to be ergonomically compatible with handheld computers.

Often, however, it is desirable to use a single display module with a variety of host devices. Further, it is often desirable to provide such display devices having a relatively small size.

It is known that modules can extend the functionality of a handheld computer. However, the user has certain customized preferences and key data that must be programmed into every electronic device. Preferably, the user should need to configure custom preferences and input key data only once and have that information shared with a variety of host devices.

Accordingly, there is a need for a display device module that includes a removably connectable interface for mechanically coupling to a host device. With regard to intelligent host devices, there is a further need to include a communication interface for interoperability and data sharing between the display module and the host device. Finally, there is a need for a system standard for removably coupling the display device module to a variety of host devices.

Further still, there is a need for a foldable accessory device that interfaces with a card slot in a portable electronic device when unfolded and may also attach to and be used with other electronic devices when folded. There is also a need for a foldable accessory device that can be folded to provide protection to the device and portability.

The techniques and structure described herein extend to those embodiments which fall within the scope of the appended claims, regardless of whether they accomplish one or more of the above-mentioned needs.

SUMMARY

An exemplary embodiment relates to a display module for a handheld computer. The display module includes a display housing and a display incorporated into the display housing. The display module also includes an interface housing. Further, the display module includes an interface configured to be removably coupled to the handheld computer. The interface is incorporated into the interface housing. Further still, the display module includes a memory.

Another exemplary embodiment relates to an accessory module for a portable electronic device. The accessory module includes an accessory housing. The accessory module also includes an interface for making electrical connection between the accessory module and a host device, and an interface housing for supporting the interface. The interface housing is hinged to the accessory housing such that the interface housing can fold behind the accessory housing, and the interface housing can unfold to extend for insertion into an interface slot in a handheld computer.

Yet another exemplary embodiment relates to a portable display module for coupling to a host device. The portable display module includes a display housing and a display coupled to the display housing. The portable display module also includes an interface housing and an interface configured to be removably coupled to the host device. The interface is incorporated into the interface housing. Further, the portable display module includes a memory.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
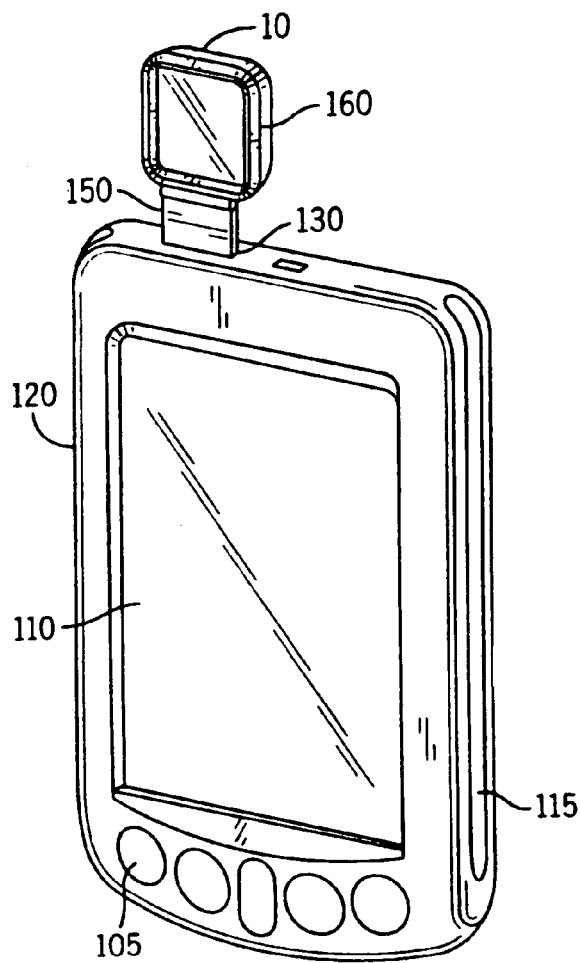
FIG. 1 is a front perspective view of a display module partially coupled to a handheld computer.

A miniature display module or other accessory module for use as an accessory with a handheld computer and a variety of other host devices is described. The miniature display module may include a display screen for displaying information, an interface for communicating with host devices, and non-volatile memory (or other memory devices) for storing information. To couple to a host device for data communication, the user may either fold the interface behind the display for attachment to certain host devices, or the user may extend the interface for insertion into certain other host devices. The disclosure below discusses a preferred display module embodiment, however, it should be noted that the characteristics and features of the display modules disclosed are equally applicable to other types of accessory devices even if a display is not incorporated therein.

When used as an accessory to a host device having an interface slot for receiving the display module data interface, such as a handheld computer, the interface housing may be extended for insertion into an interface slot such that the display module may be in data communication with the host device data interface. Alternatively, when used as an accessory with a host device, such as a wristband, having a cavity for receiving the folded display module, the foldable portion is folded such that the display module data interface is in data communication with the host device data interface. For the data interface of the present invention, either electrical interconnects make secure electrical connection, an optical interface may be located so as to permit reliable data transfer or a radio frequency (RF) transceiver may be used to provide data communications to a host device. The data interface may comprise any suitable format, such as CAN (Controller Area Network), but is preferably compatible with a Secure Digital (SD) interface, a multimedia card (MMC) interface, or the like.

An exemplary embodiment of the display module relates to a handheld computer having an interface slot to receive the display module interface. The display module data interface, for example a Secure Digital (SD) interface, is configured to be removably connectable to the handheld computer and to communicate data between the host device and the display module. The display module includes memory and display control circuitry. Further, the display device includes a power source, preferably fed by a battery, but is alternatively fed by the host device through an electrical interface. Similarly, the display module is removably connectable with a variety of host devices that can include, but are not limited to any compatible device, such as handheld computers, screen projectors, e-books, games, toys, cameras, MP3 players, home controls, car controls, remote controls, mobile telephones, and watches.

The exemplary embodiments of the present invention permit the user to enter important information and to set desired customized preferences using a host device, such as a handheld computer, and the display module stores this information in non-volatile memory (NVM) or any other memory devices. This capability permits the user to use the display module with a variety of host devices without the need to repetitively enter key information, such as identification data and time, into numerous host devices. Through its interface, the display module can present that stored information to other host devices. Via the display module, host devices may also transfer data, such as maintenance schedules, to the calendar program database of a handheld computer.

In an alternative exemplary embodiment, an accessory module may be a global positioning system (GPS) module, a modem module, a Bluetooth transceiver module, an IEEE 802.11 module, an infrared module, a scanner module, or the like. The accessory module is foldable (see FIGS. 3A-3C, for example) and can be used in either the folded or unfolded state depending on the configuration of the host device to which it is connected. Further, the accessory module may be folded for compactness and portability. Further still, the accessory may be folded to provide protection of the device and contacts.

Another exemplary embodiment relates to a wearable host device that has no data processing capability, such as a watch wristband configured for receiving a display module. The wearable host device includes a cavity for accepting the display module. The display module preferably has a foldable portion such that the footprint of the cavity has approximately the same area as the viewable area of the display module. The display module is preferably capable of receiving user input and retaining and displaying information while attached to the wearable host device. In a preferred embodiment, the wearable accessory includes a power source, such as a battery or solar cells, to supply energy to the display module.

There are two modes for coupling the display module to a host device. In a first mode, the display module interface housing extends for insertion into the host device interface slot. A host device adapted to this first mode, such as a handheld computer, includes a housing and an interface slot in the housing to receive the extended display module interface housing. In a second mode, the display module interface housing may be folded behind the display screen of the display module, and the folded display module may be inserted into a host device interface cavity. A host device adapted to this second mode, such as a watch wristband, includes a housing and an interface cavity in the housing to receive the folded display module. In either embodiment, the display module can be removed from the host device and subsequently coupled to a different host device without loss of important data stored in the display module memory.

In a preferred embodiment, the display module can couple to a host device both for mechanical support and for data transfer. The host device can mechanically receive the display module either with an extended display module interface inserted into a slot in the host device housing, or with a folded interface in which the back of the display module may be received into a cavity on the host device housing. The host device can achieve data communication with the display module via either electrical contacts or an optical interface, such as an infrared interface. Preferably the host device uses a Secure Digital (SD) interface for data communication with the coupled display module.

Referring to FIG. 1, display module 10 is shown as an accessory for handheld computer 100. Handheld computer 100 may include Palm™ computers and other devices available from Palm, Inc., of Santa Clara, Calif. Other exemplary embodiments of the invention may relate to Windows CE handheld computers, or other handheld computers and personal digital assistants (PDAs), as well as mobile telephones, beepers, electronic books (e-books), and other electronic and non-electronic devices.

Preferably handheld computer 100 includes interactive hardware and software that performs functions such as maintaining calendars, phone lists, task lists, notepads, calculation applications, spreadsheets, games, and other applications capable of running on a computing device. Handheld computer 100, as depicted in FIG. 1, includes a plurality of input functions, keys 105 and a display 110 having graphical user interface features. Display 110 may be provided with an interface that allows a user to select and alter displayed content using a pointer, such as, but not limited to, a stylus which may be stowed in a stylus slot 115 of housing 120 of handheld computer 100. To permit functional expansion, handheld computer 100 further includes an interface slot 130 in housing 120 for coupling to a variety of accessory devices.

The display module of the present invention can function as an accessory device with a variety of host devices, including a handheld computer. Referring to an exemplary embodiment depicted in FIG. 1, a display module 10 may be connectable to handheld computer 100 as an accessory device. The display module 10 couples to the interface slot 130 in housing 120 of handheld computer 100. In an exemplary embodiment, display module 10 may be based on the Secure Digital (SD) interface which is a standard using devices approximately the size of a conventional postage stamp. Consequently, the display module may be also of suitable size to be ergonomically compatible with handheld devices.

In an exemplary embodiment, interface slot 130 includes a connector arranged to comply with the SD standard. In operation, a user of handheld computer 100 couples display module 10 to interface slot 130 by sliding an interface housing 150 into interface slot 130 where an electrical connection may be made between a connector on the display module and an SD connector of handheld computer 100. In an alternative embodiment, inserting interface housing 150 into interface slot 130 aligns optical transceivers, thereby forming, for example, an infrared (IR) link for transferring data. In similar fashion, the display module of the present invention can couple to a variety of other types of host devices that are configured with an arrangement corresponding to interface slot 130 of handheld computer 100. Further, in an alternative embodiment an RF communications link may be made between RF transceivers in both the host device, such as handheld computer 100 and display module 10 for transferring data between the two devices.

Figure 2:
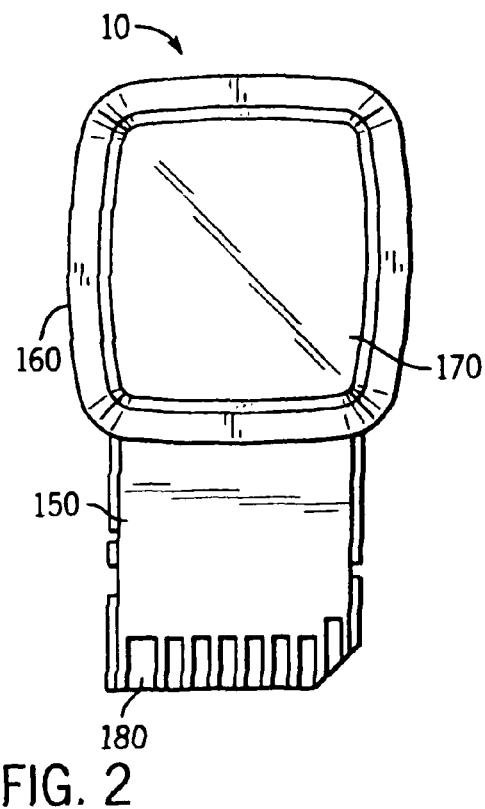
FIG. 2 is a front view of the display module of FIG. 1 with the interface fully extended.

Referring to FIG. 2, an exemplary embodiment of display module accessory device 10 is shown. Display module 10 includes a display housing 160 that encompasses the edges of a display screen 170. Display screen 170 displays information, including text and graphics, to the user. Display housing 160 is hingeably or rotatably coupled to interface housing 150. Interface housing 150 provides support for electrical interconnects 180 which make electrical contact with a connector in handheld computer 100 or other host device. Electrical interconnects 180 are formed on interface housing 150 such that they are exposed both when interface housing 150 is folded and when interface housing 150 is extended.

Figure 3A:
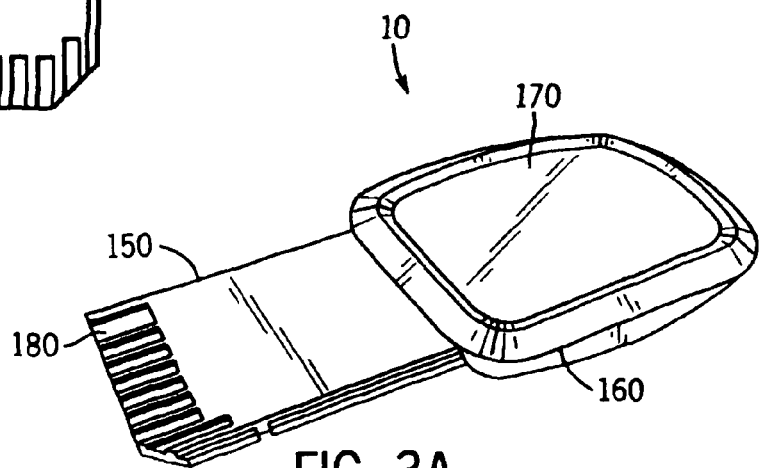
FIG. 3A is a side perspective view of the display module of FIG. 1 with the interface fully extended.
Figure 3B:
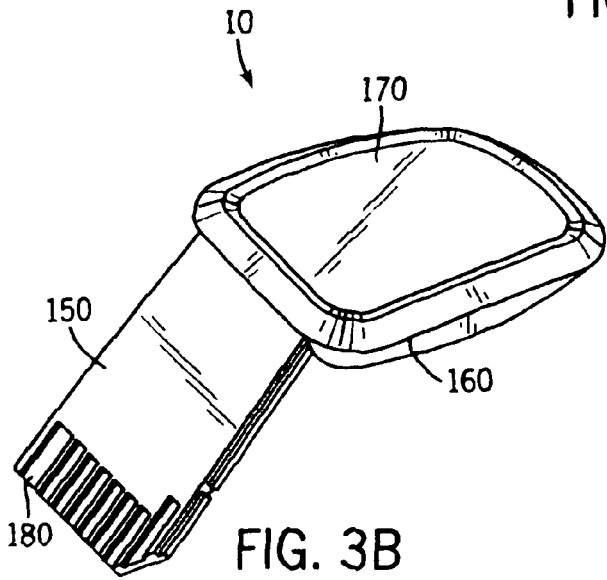
FIG. 3B is a side perspective view of the display module of FIG. 1 with the interface partially folded.
Figure 3C:
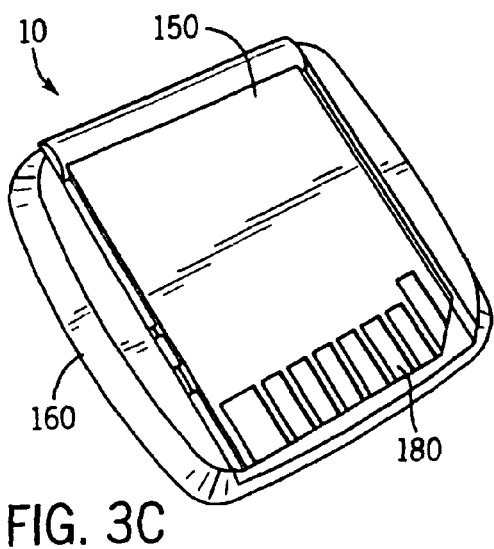
FIG. 3C is a rear perspective view of the display module of FIG. 1 with the interface fully folded.

Referring to FIGS. 3A-3C, an exemplary embodiment of display module accessory device 10 is depicted. Because display module housing 160 is hingeably connected to interface housing 150, the user can vary the angle between them. Interface housing 150 can be fully extended, as depicted in FIG. 3A. Interface housing 150 can also be partially folded, as depicted in FIG. 3B. Furthermore, interface housing 150 can also be fully folded, as depicted in FIG. 3C. In an exemplary embodiment, a user can adjust the display screen angle while display module 10 is coupled to a host device, such as handheld computer 100 in FIG. 1. In a particularly preferred embodiment, the hinged connection between interface housing 150 and display housing 160 may include detents such that display housing 160 may be held at a plurality of discrete relative angles relative to interface housing 150 (see, e.g., FIG. 3B). Providing detents allows a user to have the choice of a plurality of viewing angles when display module 10 is coupled to handheld computer 100. In an alternative embodiment, the hinged or rotatable connection between display housing 160 and interface housing 150 may be configured to allow tilting of display housing 160 either forward or backward from the position depicted in FIG. 1. Such forward or backward bending helps to absorb shock if display module 10 were to receive an impact (dropped, etc.) and may further protect the hardware of handheld computer 100 adjacent slot 130.

Figure 4A:
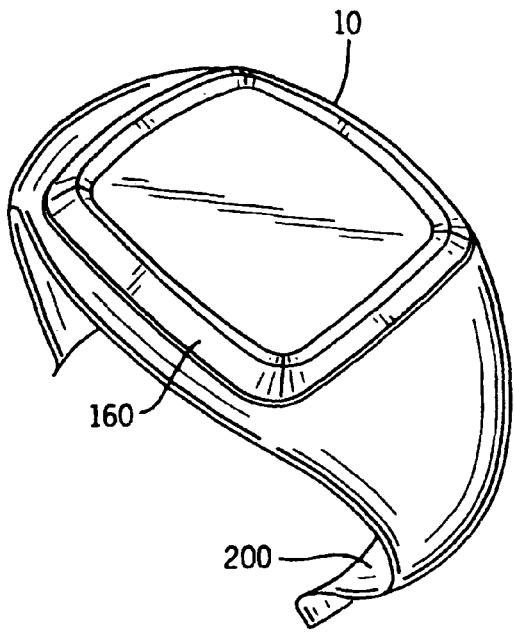
FIG. 4A is a top perspective view of the display module of FIG. 1 with the interface fully folded and coupled to a wrist band.
Figure 4B:
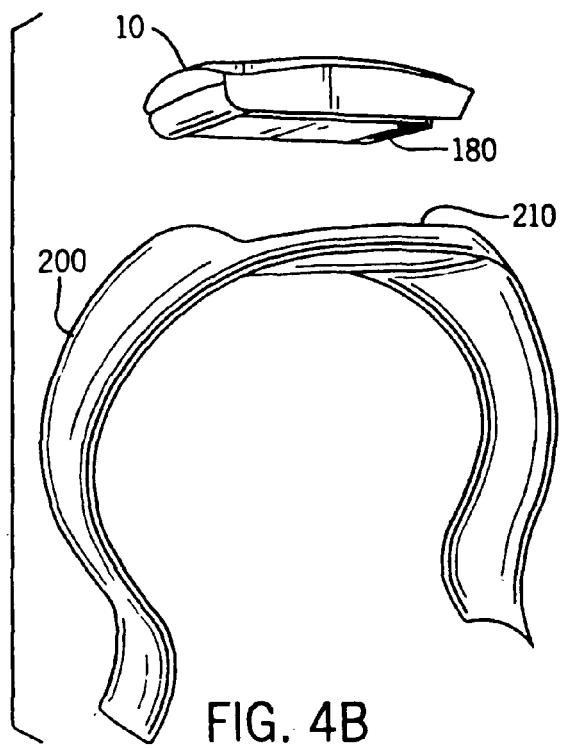
FIG. 4B is an exploded side perspective view of the display module of FIG. 1 with the interface fully folded and decoupled from the wrist band of FIG. 4A.

Referring to FIGS. 4A-4B, display module 10 may be connectable to wearable host devices, such as wrist band 200. In a preferred embodiment, display module 10 may be secured within an interface cavity 210 (see FIG. 4B) such that the surface of display housing 160 may be flush with the surrounding surface of the wrist band, forming a protective pocket. In another embodiment, display module electrical interconnects 180 make contact with interconnects provided in the wrist band to permit data and energy transfer between devices, if the host device wrist band 200 includes, for example, integrated memory, batteries or solar cells. Display module 10 can couple to wrist band 200 only when interface housing 150 is fully folded behind display housing 160. A user can insert or remove display module 10 from interface cavity 210 of wrist band 200 as needed.

Figure 5:
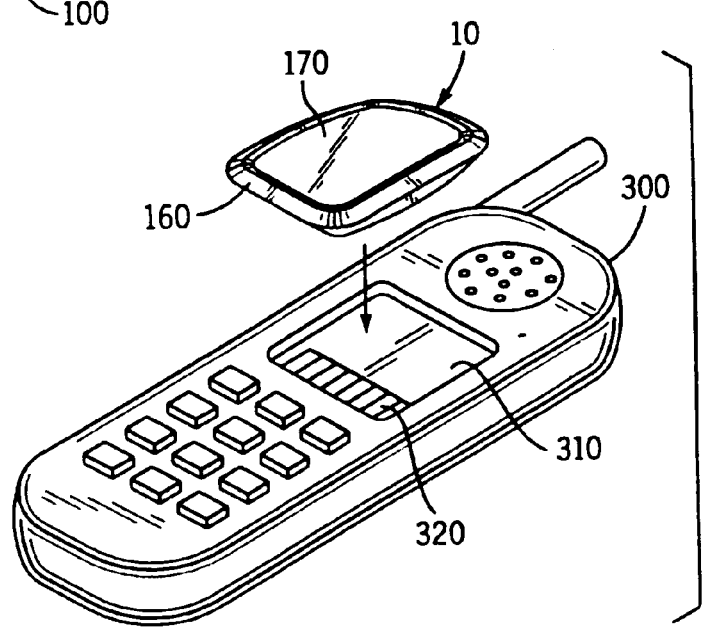
FIG. 5 is a front perspective view of the display module of FIG. 1 with the interface fully folded and decoupled from a mobile telephone.

Referring to FIG. 5, display module 10 may be connectable to handheld host devices, such as, but not limited to mobile telephone 300. In an exemplary embodiment, display module 10 may be secured within an interface cavity 310 such that the surface of display housing 160 may be flush with the surrounding surface of mobile phone 300, forming a protective pocket. In another embodiment, electrical interconnects 180 of display module 10 make contact with electrical interconnects 320 provided in mobile telephone 300 to permit data and energy transfer between the devices. Display module 10 can couple to mobile telephone 300 only when fully folded. A user can insert or remove display module 10 from interface cavity 310 of mobile telephone 300 as needed.

Referring to the present invention generally, display housing 160 and interface housing 150 contain at least non-volatile memory (NVM) and display driver circuitry. In another embodiment, display module 10 further contains typical electronic elements that are well known in the art pertaining to handheld computers, including, but not limited to, the following: power sources, processing capability, program memory, input features, output features, backlighting. Power sources may include batteries or energy storage elements, and associated power conditioning circuits. Processing capability can include ASICs, microcontrollers, microprocessors, or other functional circuitry capable of processing information or controlling circuit operations. Program memory can provide a processing element with the ability to execute flexible functional behavior. Input features can include, for example, a touch screen capability of display screen 170, buttons, dials, IR receivers, and electro-audio transducers. Exemplary output features that the accessory display module can incorporate include electro-audio transducers, buzzers, IR transmitters, or indicator lights. A backlighting capability extends display viewability to include a wide range of ambient lighting conditions. Thus, the present invention is configured to incorporate a range of functional capabilities within display housing 160 and interface housing 150.

In an exemplary embodiment, a variety of host devices can utilize display module 10 as an accessory device, including, but not limited to, the following: e-books, games, toys, projectors such as those sold under the trademark INFOCUS, MP3 players, cameras, key fob or pendant, home control, car control, remote control, pedometer or digital sport assistant, device configuration resource, mobile telephones, watches, notebook computers, palmtop computers, integrated automotive computers, and the like, without departing from the scope of the invention. Further, a display module may be used as a stand-alone device. For example, the display module can display information, such as, but not limited to, the local time and date, when not coupled to any electronic device or when worn as a watch on a wristband configured to receive the folded display module.

Numerous example applications for display module 10 can be recited beyond the basic use as an accessory for a handheld computer. Used in e-book applications, display module 10 can function as a bookmarker, companion device, auxiliary display, or a tutorial aid to enable the user to learn, for example, new words. For game players, display module 10 can store favorites and preferences, act as an opponent or companion, serve as a portable gaming platform, or provide a convenient Tamagouchi-style game experience. With regard to toys, display module 10 can interface to inexpensive electronic toys and provide a programming capability that includes a display. Display module 10 can further control a projector system, such as those sold under the trademark INFOCUS, or provide memory and display as well as remote viewing capability for cameras. When used with an MP3 player system, the display module may provide the memory and display, thereby allowing the MP3 player to consist of merely a decoder, batteries, and an audio amplifier. Display module 10 can further automatically configure vehicle preferences for such items as those relating to seat positions and programmed radio channels. In home control applications, the display module can function as a door key or security system key, set house preferences, locate the user, and forward voice call data to the user. A further example includes functioning as a pedometer display and recorder, or as a sports score recorder (e.g., golf score). Such a display module may also serve as part of a remote control to establish customized preferences. An information technology (IT) device may host the display module during device configuration and maintenance. Mobile telephones may benefit from the memory storage and display capabilities of the display module of the present invention, thereby reducing the cost, size, and complexity of the mobile telephone. As a further example, wearable host devices, such as a wristband, can be configured to receive a display module to provide access to personal information and conventional digital watch functions.

Display module 10 has many advantages valuable to a user including, but not limited to, cost reductions combined with increased functionality. First, because the display module interfaces to the host device only when needed, eliminating displays can reduce the overall cost of host devices and user interfaces dedicated to individual host devices. In addition, cost limitations often dictate that the dedicated displays have less capability than display module 10, so the display quality may be improved. Second, host devices that previously lacked display capability can now provide detailed status and operational information to the user on-demand via display module 10. Because a single display module 10 can interface to a variety of devices as the user needs access, it creates the opportunity for the host device to provide helpful information to the user, including instructional, maintenance, diagnostic, and repair information. Data received by display module 10 from a host device can automatically update maintenance schedule information on a subsequent synchronization with the calendar or task programs of the handheld computer. As an example, a vehicle, acting as a host device, may transfer a complete factory recommended maintenance schedule to display module 10, which subsequently transfers the schedule to handheld computer 100, whereby handheld computer 100 calendar program alerts the user as scheduled maintenance is needed.

While the detailed drawings, specific examples, and particular formulations given describe exemplary embodiments, they serve the purpose of illustration only. The hardware and software configurations shown and described may differ depending on the chosen performance characteristics and physical characteristics of the computing devices. For example, the type of computing device, communications bus, or processor used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device, comprising:
   a display;
   a processor coupled to the display;
   an interface configured to communicate with a computing device, such that the interface is configured to facilitate a data transfer with the computing device; and
   a memory coupled to the processor, the memory being configured to store a set of custom user preferences, wherein the custom user preferences are transmitted to the computing device to configure custom user preferences on the computing device;
   wherein the interface is configured to exchange data with the computing device through wired electrical interconnects.

2. The mobile computing device of claim 1, further comprising a user interface configured to receive an input from a user.

3. The mobile computing device of claim 1, further comprising a housing for the display.

4. The mobile computing device of claim 1, further comprising a power supply coupled to the processor.

5. The mobile computing device of claim 1, wherein the memory comprises non-volatile memory.

6. The mobile computing device of claim 1, wherein the interface is configured to exchange data with the computing device through an optical data link.

7. The mobile computing device of claim 1, wherein the custom user preferences comprise user identification information.

8. The mobile computing device of claim 1, wherein the interface is configured to receive power from the computing device.

9. The mobile computing device of claim 1, wherein the custom user preferences are transmitted by the mobile computing device based on a request from the computing device.

10. A method of transferring data from a mobile computing device, comprising:
    establishing a wireless communication link between the mobile computing device and a second computing device;
    retrieving a set of data stored in a memory of the mobile computing device; and
    transferring the set of data to the second computing device, the set of data including data customized to preferences of a user to configure custom user preferences on the second computing device;
    wherein the mobile computing device is configured to receive power from the second computing device.

11. The method of claim 10, further comprising receiving a request from the second computing device to transfer the set of data from the mobile computing device.

12. The method of claim 10, wherein the set of data further includes user identification information.

13. The method of claim 10, further comprising receiving an input from a user via a user interface of the mobile computing device.

14. The method of claim 10, wherein the memory includes non-volatile memory.

15. A method of configuring a primary computing device based on a set of data received from a mobile computing device, comprising:
    establishing a wireless communication link between the primary computing device and the mobile computing device;
    transmitting a request to the mobile computing device to transfer the data from the mobile computing device, the data being stored in a memory of the mobile computing device;
    receiving the data from the mobile computing device, the set of data being provided to configure custom user preferences on the primary computing device; and
    configuring custom user preferences on the primary computing device using the set of data;
    wherein the primary computing device is configured to provide power to the mobile computing device.

16. The method of claim 15, wherein the data further includes user identification information.

17. The method of claim 15, wherein the data further includes data customized to preferences of a user.

18. The method of claim 15, further comprising receiving an input from a user via a user interface of the mobile computing device.

19. The method of claim 15, wherein the memory includes non-volatile memory.

* * * * *